Figure 1:
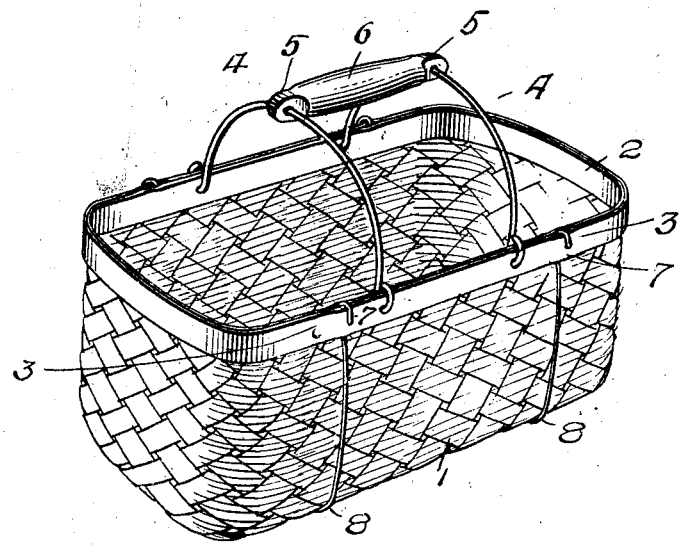

E. C. BLACK.
BASKET.
APPLICATION FILED JUNE 28, 1912.

1,047,730.

Patented Dec. 17, 1912.

WITNESSES
Samuel Payne

INVENTOR
E. C. Black.
BY
ATTORNEYS

UNITED STATES PATENT OFFICE.

EDWARD CHESTER BLACK, OF GIBSONIA, PENNSYLVANIA.

BASKET.

1,047,730.  Specification of Letters Patent.  Patented Dec. 17, 1912.

Application filed June 28, 1912. Serial No. 706,373.

*To all whom it may concern:*

Be it known that I, EDWARD CHESTER BLACK, a citizen of the United States of America, residing at Gibsonia, in the county of Allegheny and State of Pennsylvania, have invented certain new and useful Improvements in Baskets, of which the following is a specification, reference being had therein to the accompanying drawing.

This invention relates to baskets, and the primary object of my invention is to provide a basket with a double bail that has a suitable handle grip.

Another object of this invention is to provide the body of a basket with a wire reinforcement that prevents the bottom and sides of the basket from breaking when the basket contains a heavy load.

I attain the above objects by a mechanical construction that is simple, durable and highly efficient for the purposes for which it is intended.

The invention will be hereinafter specifically described and then claimed, and reference will now be had to the drawing, wherein:—

Figure 2:
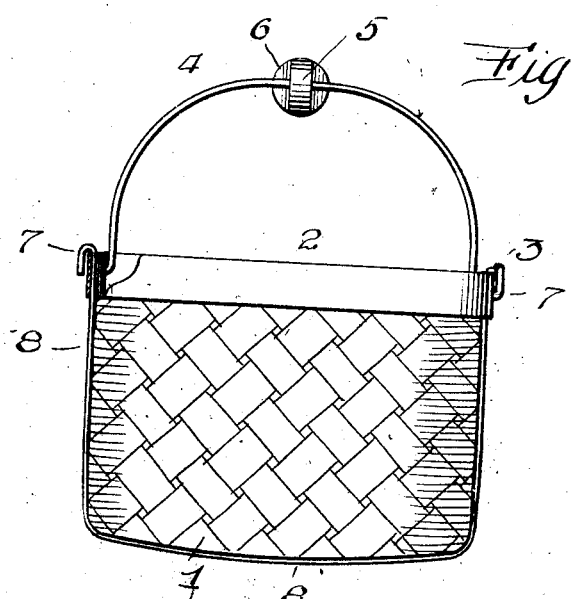

Figure 1 is a perspective view of a basket in accordance with this invention, and Fig. 2 is an end view of the same partly broken away and partly in section.

1 denotes the body of an ordinary woven basket that has the upper edges thereof provided with a band 2. Connected to the band 2, adjacent to the ends thereof, are the hook-shaped ends 3 of bails 4 and said bails support the apertured flattened ends 5 of a handle or hand grip 6. The hook shaped ends 3 of the bails 4 are in the form of open loops and the ends of the bails which terminate in said open loops enter the band 2 from the inside as more clearly shown in Fig. 2. The handle 6 permits of the basket 1 being easily carried without any danger of the same overbalancing.

I attach considerable importance to the manner in which the hook-shaped ends 3 are connected to the band 2, as the bails 4 can be swung downwardly into the basket with the handle 6 upon the bottom of the basket, thus permitting the basket being used without the bails, it being a well known fact that baskets, in a delivery wagon, are often stored one upon the other. In other words, the basket can be used for storage purposes as well as for transporting merchandise.

Connected to the band 2, adjacent to the ends of the bails 4, are the ends 7 of reinforcing wires 8 that pass downwardly and under the bottom of the basket 1. These wires brace the sides of the basket and support the bottom thereof, whereby a heavy load can be safely carried in the basket. The ends 7 of the reinforcing wires pass between the plies of the band 2, consequently the band is not weakened or apertured and the ends of the reinforcing wires 8 are firmly held.

What I claim is:—

In combination a basket, a body portion having an open top, a band connected to the top of the body portion, a pair of spaced bails each having an end thereof formed into an open loop connected to the band and extending through the band from inside out whereby the bails can be swung downwardly within the body portion of the basket, and the handle having apertured ends connected to said bail.

In testimony whereof I affix my signature in the presence of two witnesses.

EDWARD CHESTER BLACK.

Witnesses:
 MAX H. SROLOVITZ,
 K. H. BUTLER.